United States Patent [19]

Guhne et al.

[11] 4,134,605

[45] Jan. 16, 1979

[54] ARRANGEMENT FOR CONNECTING AN ATTACHMENT TO A VACUUM CLEANING DEVICE

[75] Inventors: Wieland Gühne, Remscheid; Paul Lienenlüke, Sprockhövel, both of Fed. Rep. of Germany

[73] Assignee: Vorwerk & Co. Interholding GmbH, Wuppertal, Fed. Rep. of Germany

[21] Appl. No.: 815,365

[22] Filed: Jul. 13, 1977

[30] Foreign Application Priority Data

Jul. 16, 1976 [DE] Fed. Rep. of Germany ......... 224538

[51] Int. Cl.$^2$ .............................................. A47L 9/24
[52] U.S. Cl. ........................................ 285/7; 285/317; 285/328; 285/331; 285/332.2; 285/24; 138/115; 138/116
[58] Field of Search .................. 285/7, 331, 332.2, 24, 285/317, 174, 133 R, 138, 328; 138/115, 116

[56] References Cited

U.S. PATENT DOCUMENTS

| | | | |
|---|---|---|---|
| 714,476 | 11/1902 | Grubbs | 285/331 X |
| 1,483,028 | 2/1924 | Walsh | 285/174 X |
| 2,159,116 | 5/1939 | Zacharias | 285/7 |
| 2,245,151 | 6/1941 | Martinet | 285/317 X |
| 2,832,612 | 4/1958 | Coutts | 285/7 |

Primary Examiner—Werner H. Schroeder
Assistant Examiner—C. J. Arbes
Attorney, Agent, or Firm—Michael J. Striker

[57] ABSTRACT

An arrangement for connecting an attachment to a vacuum cleaning device includes two connecting sleeves, one on the attachment and the other on the device. One of the connecting sleeves has an inner and an outer portion which together bound a groove in which a projecting portion of the other connecting sleeve is received in the assembled condition. The shapes of such portions are identical but the dimensions thereof are proportionately different. Each of the portions includes a part-cylindrical circumferential zone and a polygonal zone gradually merging with the part-circular zone and complementing the same into the respective circumferentially complete portion. The other connecting sleeve may have a transverse wall at the polygonal zone, which abuts against a corresponding transverse region of the one connecting sleeve, and a seal may be sandwiched therebetween in the assembled condition. Another seal may be accommodated in the groove in the assembled condition.

10 Claims, 3 Drawing Figures

ARRANGEMENT FOR CONNECTING AN ATTACHMENT TO A VACUUM CLEANING DEVICE

BACKGROUND OF THE INVENTION

The present invention relates to an arrangement for sealingly and detachably connecting the associated ends of the consecutive sections of an air conduit used in a vacuum cleaning device in general, and more particularly to such an arrangement for use for connecting an attachment to the vacuum cleaning device.

There have been already proposed various connecting arrangements of the type here under consideration, in many of which resort has been had to associated connecting sleeves one of which embraces the other in the assembled condition. To maintain the connecting sleeves in their assembled condition until disassembly, it has also already been proposed to provide the connecting sleeves with an arresting arrangement which, upon insertion of the inner one of the connecting sleeves into the outer one, arrests the inner sleeve in its inserted position. So, for instance, it has already been proposed to construct the arresting arrangement as a yieldable biased arresting member which is mounted on one of the connecting sleeves and which engages in a depression or the like of the other connecting sleeve in the assembled condition, to hold the connecting sleeve against axial displacement relative to one another until the arresting member is withdrawn from the depression.

Inasmuch as the connecting sleeves connect different sections of an air conduit, such as of a suction conduit, it is further required that the connecting arrangement consisting of the two associated connecting sleeves be gas-tight to the maximum feasible extent, that is, that it virtually eliminate any possibility of flow of gases through the interface between the connecting sleeves between the exterior and the interior of the conduit. To assure such gas-tightness, it has been already proposed to give both connecting sleeves slight conicities so that the inner connecting sleeve can be introduced into the interior of the outer connecting sleeve to such an extent until the conical inner and outer surfaces of the two connecting sleeves sealingly contact one another.

In such arrangements, it is quite disadvantageous that the dimensions of the connecting sleeves must be made to exact specifications, with only minimum tolerances. Were it otherwise, it would be possible that, when the inner connecting sleeve is fully inserted into the outer connecting sleeve to establish sealing contact therewith, the arresting member would be out of registry with the associated depression and thus could not engage therein. On the other hand, the other possibility, which is equally disadvantageous, would be that the arresting member would engage in the associated depression before the inner connecting sleeve has been fully inserted into the outer connecting sleeve. Under these circumstances, the conical surfaces of the two connecting sleeves would be out of, or only in an insufficient, contact with one another so that the path inbetween the two connecting sleeves which communicates the exterior with the interior of the conduit would be only insufficiently obstructed and, hence, air will be permitted to penetrate through the interspace between the two conical surfaces when the arresting member arrests the two sleeves in their arrested position. Furthermore, when torque is applied to the connection about the common axis of the connecting sleeves, the only force opposing rotation of the connecting sleeves relative to one another is that with which the arresting member abuts against the wall bounding the depression so that, given sufficient torque, the arresting member either is displaced out of the depression, thus terminating the arresting action thereof, or is destroyed or damaged when the force acting thereon exceeds a certain value. Thus, it will be appreciated from the above explanation that, in the above-discussed conventional arrangement, a connection which satisfies all the requirements can only be achieved when the two associated connecting sleeves and the associated parts are manufactured with a high degree of precision.

SUMMARY OF THE INVENTION

Accordingly, it is a general object of the present invention to avoid the above-discussed disadvantages of the prior art.

More particularly, it is an object of the present invention to provide a connecting arrangement of the type here under consideration which prevents, in a simple manner, the rotation of the connecting sleeves with respect to one another in the assembled condition.

It is yet another object of the present invention to provide a connecting arrangement which is capable of withstanding all of the forces acting thereon during the operation of the vacuum cleaning device.

A concomitant object of the present invention is to provide a connecting arrangement for use in connection with a vacuum cleaning device, which is simple in construction, reliable in operation and inexpensive to manufacture.

A still further object of the invention is to so construct the connecting arrangement that it is capable of being hermetically sealed in the assembled condition thereof.

In pursuance of these objects and others which will become apparent hereafter, one feature of the present invention resides, in a vacuum cleaning device of the type having an air conduit including at least two consecutive sections, briefly stated, in an arrangement for sealingly and detachably connecting the associated ends of the consecutive sections, which arrangement comprises two associated connecting sleeves each connected to one of said associated ends, one of said connecting sleeves including an inner portion having an outer circumferential surface and an outer portion having an inner circumferential surface which is spaced from said outer circumferential surface to bound a receiving groove therewith, the other connecting sleeve having a projecting portion fittingly receivable in said groove of said one connecting sleeve in the assembled condition of the consecutive sections. Preferably, said inner and outer portions of said one connecting sleeve have identical cross-sectional shapes but proportionately different dimensions. Then, it is advantageous when said projecting portion of said other connecting sleeve has a cross-sectional shape identical to but dimensions proportionately different from those of said inner and outer portions of said one connecting sleeve. Under these circumstances, said inner and outer circumferential surfaces are spaced substantially the same distance from one another over the entire circumference thereof.

According to a further currently preferred aspect of the present invention, at least said projecting portion of said other connecting sleeve has a substantially part-cylindrical circumferential zone and a substantially polygonal, preferably rectangular, circumferential zone gradually merging with and complementing said part-cylindrical circumferential zone in the circumferential direction of said other connecting sleeve. In order to improve the guidance of the other connecting sleeve during the introduction thereof into the one connecting sleeve, it is further proposed according to the present invention for the inner portion of said one connecting sleeve to be recessed with respect to the longitudinal end face of the one connecting sleeve, into the interior of said outer portion.

In order to be able to seal the interface between the two connecting sleeves in a simple and reliable manner, it is further advantageous when said inner portion of said one connecting sleeve has a transversely extending portion, and said other connecting sleeve has a transverse wall in the region of said polygonal circumferential zone and having an abutment face which abuts against said transversely extending portion of said inner portion of said one connecting sleeve in said assembled position. Under these circumstances, it is further proposed to provide a seal which is mounted on one of said transversely extending portion of said inner portion of said one connecting sleeve and said transverse wall of said other connecting sleeve at said abutment face thereof, said seal being sandwiched between said transversely extending portion and said abutment face in said assembled condition.

The projecting portion of said other sleeve, by being received in the groove in the assembled condition, forms a labyrinthine seal with the respective inner and outer portion of said one connecting sleeve between which it is received. However, to further improve the sealing effect, it is additionally proposed by the present invention to accommodate a sealing element in said groove of said one connecting sleeve in said assembled condition. The present connecting arrangement is particularly advantageous when one of said connecting sleeves is integral with a suction attachment of the vacuum cleaning device.

The connecting arrangement which has been discussed above has a pronounced advantage in that such a connecting arrangement of two connecting sleeves remains nonrotational and the sleeves retain their mutual positions in the assembled condition, even when substantial torques are applied to the two connecting sleeves. An additional advantage obtained by resorting to the use of the connecting arrangement of the present invention is that it is possible to always position various attachments of the vacuum cleaning device on the latter in the same position, owing to the special configuration of the cooperating portions of the connecting sleeves. In addition thereto, the present invention achieves, in a simple manner, a very good sealing effect even if the two connecting sleeves do not exactly fit one another, due to the special construction of the connecting sleeves and the labyrinthine and other seal obtained thereby.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
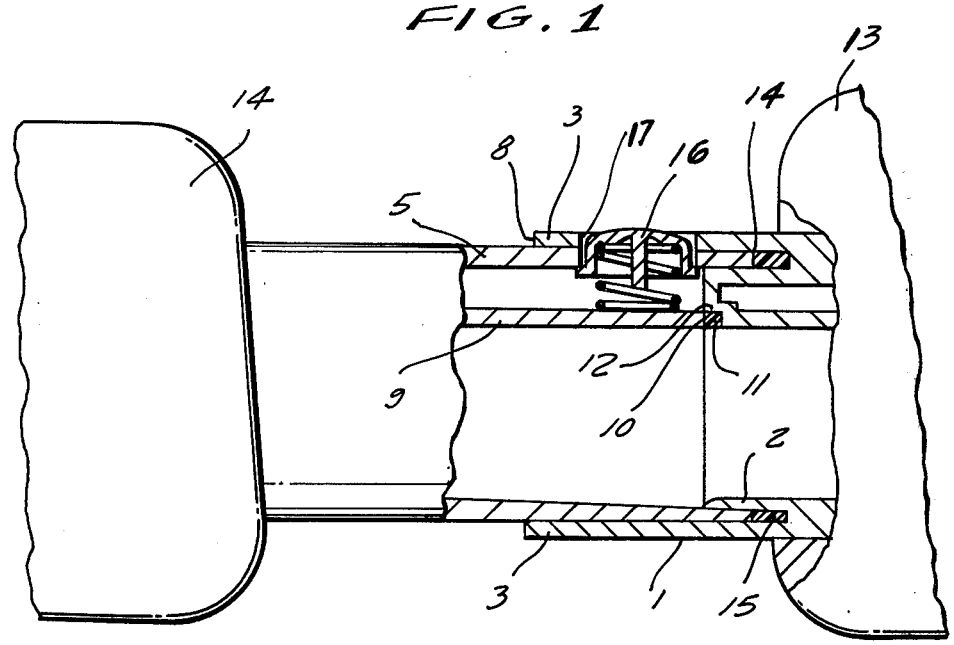
FIG. 1 is a partly sectioned side elevational view of the connecting arrangement of the present invention.

Referring now to the drawings in detail, and first to FIG. 1 thereof, it may be seen therein that the reference numeral 13 designates a vacuum cleaning device which has been illustrated only diagrammatically. On the other hand, the reference numeral 14 designates an attachment for the vacuum cleaning device 13, which has also been illustrated only diagrammatically. The vacuum cleaning device 13 and the attachment 14 are interconnected by means of connecting sleeves 1 and 5. The connecting sleeve 1 which is, for instance, integral with the vacuum cleaning device 13, includes an outer portion 3 and an inner portion 2. The inner portion 2 and the outer portion 3 bound with one another a groove 4 in the connecting sleeve 1. The connecting sleeve 5, on the other hand, has a projecting portion which is accommodated in the groove 4 in the assembled condition of the sleeves 1 and 5. The connecting sleeve 5 has a transverse wall 9 and an end face 10 thereon, and the inner portion 2 of the connecting sleeve 1 has a transversely extending portion 11 on which there is mounted a seal 12 against which the end face 10 of the transverse wall 9 of the connecting sleeve 5 abuts in the assembled condition of the sleeves 1 and 5. In addition thereto, a sealing element 15 is accommodated in the groove 4, and the projecting portion of the connecting sleeve 5 abuts against the sealing element 15 in the assembled condition. Thus, the sealing effect is improved by the presence of the sealing element 15.

The sealing effect between the connecting sleeves 1 and 5 is achieved in a very simple manner which can be ascertained from the drawing. The inner part 2, the outer part 3 and the projecting portion of the connecting sleeve 5, in their assembled condition, form a labyrinthine seal in the groove 4, the sealing affect of which is enhanced by the presence of the seals 12 and 15. Thus, the interior of the connection is hermetically sealed with respect to its exterior in the assembled condition of the connecting sleeves 1 and 5.

As is further apparent from the drawing, the inner portion 2 is recessed with respect to an end face 8 of the outer portion 3. This is rather important in order for the connecting sleeve 5, which is being introduced into the connecting sleeve 1, to be so guided interiorly of the outer portion 3 of the connecting sleeve 1, prior to its introduction into the groove 4, that it is, of necessity, guided toward the groove 4.

FIG. 1 further illustrates that an arresting button 16 is mounted on the connecting sleeve 5 and biased towards its extended position in which it is received in an opening 17 of the connecting sleeve 1 in the assembled condition thereof. However, it is also possible for the arresting button 16 to be mounted on the connecting sleeve 1, and engage the connecting sleeve 5.

Figure 2:
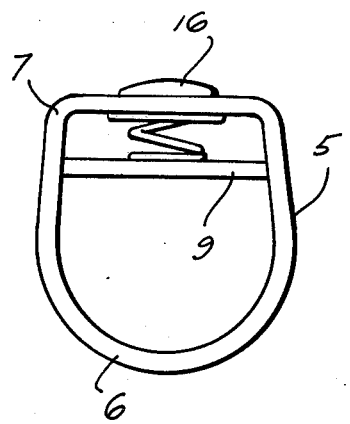
FIG. 2 is an end view of one of the connecting sleeves of FIG. 1.

FIG. 2 illustrates an end view of the connecting sleeve 5 and clearly illustrates the special cross-sectional shape of the connecting sleeve 5. It is apparent from this Figure of the drawing that the connecting sleeve 5 includes a substantially semi-cylindrical zone 6 and a substantially rectangular or otherwise polygonal zone 7. In addition thereto, this Figure also illustrates the transverse wall 9 which abuts against the inner portion 2 of the connecting sleeve 1 in the assembled condition, as discussed above in connection with FIG. 1. Furthermore, even the arresting button 16 is visible in this Figure.

Figure 3:
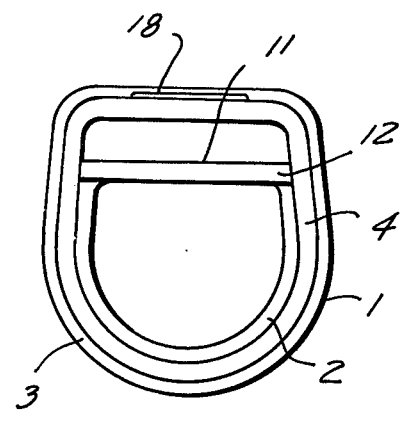
FIG. 3 is an end view of the other connecting sleeve of FIG. 1.

Finally, FIG. 3 is an end view of the connecting sleeve 1, which has the same cross-sectional shape and the connecting sleeve 5, except for the dimensions thereof which, however, are proportionate to those of the connecting sleeve 5. As explained above, the connecting sleeve 1 has two portions, that is, the inner portion 2 and the outer portion 3. The projecting portion of the connecting sleeve 5 is received in the groove 4 between the inner portion 2 and the outer portion 3 of the connecting sleeve 1, as also explained above. This Figure also illustrates the transversely extending portion 11 with the seal 12. In addition thereto, this Figure also illustrates an inclined guiding surface 18 provided at the outer portion 3, along which the arresting button 16 (illustrated in FIGS. 1 and 2) slides. As a result of this sliding contact, the arresting button 16 is pressed toward the interior of the connecting sleeve 1 during the longitudinal displacement of the connecting sleeve 5 relative to the connecting sleeve 1, so that the user of this connection need only depress this arresting button 16 when it is desired to disassemble the attachment 14 from the vacuum cleaning device 13 by displacing the connecting sleeves 1 and 2 axially relative to one another. On the other hand, the depression of the arresting button 16 is automatic during the assembly of the connecting sleeve 5 with the connecting sleeve 1.

It will be understood that each of the elements described above, or two or more together, may also find a useful application in other types of constructions differing from the types described above.

While the invention has been illustrated and described as embodied in an assembly for connecting an attachment to a vacuum cleaning device, it is not intended to be limited to the details shown, since various modifications and structural changes may be made without departing in any way from the spirit of the present invention.

Without further analysis, for foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. In a vacuum cleaning device of the type having an air conduit including at least two consecutive sections, an arrangement for sealingly and detachably connecting the associated ends of the consecutive sections, comprising two associated connecting sleeves each connected to one of said associated ends, one of said connecting sleeves including an inner portion having an outer circumferential surface and an outer portion having an inner circumferential surface which is spaced from said outer circumferential surface to bound therewith a receiving groove which is circumferentially non-circular, the other connecting sleeve having a projecting portion which is also circumferentially non-circular as to be compatibly and fittingly receivable in said groove of said one connecting sleeve in the assembled condition of the consecutive sections, for preventing relative turning of said sleeves.

2. An arrangement as defined in claim 1, wherein said inner and outer portions of said one connecting sleeve have identical cross-sectional shapes but proportionately different dimensions.

3. An arrangement as defined in claim 2, wherein said projecting portion of said other connecting sleeve has a cross-sectional shape identical to but dimensions proportionately different from those of said inner and outer portions of said one connecting sleeve.

4. An arrangement as defined in claim 1, wherein said inner and outer circumferential surfaces are spaced substantially the same distance from one another over the circumferences thereof.

5. An arrangement as defined in claim 1, wherein said outer portion of said one connecting sleeve is elongated and has a longitudinal end face; and wherein said inner portion of said one connecting sleeve is recessed with respect to said end face into the interior of said outer portion.

6. An arrangement as defined in claim 1; and further comprising a sealing element accommodated in said groove of said one connecting sleeve in said assembled condition.

7. An arrangement as defined in claim 1, wherein one of said connecting sleeves is integral with a suction attachment of the vacuum cleaning device.

8. In a vacuum cleaning device of the type having an air conduit including at least two consecutive sections, an arrangement for sealingly and detachably connecting the associated ends of the consecutive sections, comprising two associated connecting sleeves each connected to one of said associated ends, one of said connecting sleeves including an inner portion having an outer circumferential surface and an outer portion having an inner circumferential surface which is spaced from said outer circumferential surface to bound a receiving groove therewith, the other connecting sleeve having a projecting portion fittingly receivable in said groove of said one connecting sleeve in the assembled condition of the consecutive sections, at least said projecting portion of said other connecting sleeve having, as considered in cross-section, a substantially part-cylindrical circumferential zone and a substantially polygonal circumferential zone gradually merging with and completing said part-cylindrical cicumferential zone in the circumferential direction of said other connecting sleeve.

9. An arrangement as defined in claim 8, wherein said inner portion of said one connecting sleeve has a transversely extending portion; and wherein said other connecting sleeve has a transverse wall in the region of said polygonal circumferential zone and having an abutment face which abuts against said transversely extending portion of said inner portion of said one connecting sleeve in said assembled condition.

10. An arrangement as defined in claim 9; and further comprising a seal mounted on one of said transversely extending portions of said inner portion of said one connecting sleeve and said transverse wall of said other connecting sleeve at said abutment face thereof, said seal being sandwiched between said transversely extending portion and said abutment face in said assembled condition.

* * * * *